United States Patent [19]

Wang et al.

[11] Patent Number: 5,064,531

[45] Date of Patent: Nov. 12, 1991

[54] WATER FILTRATION APPARATUS

[75] Inventors: Lawrence K. Wang; Mu Hao S. Wang, both of Latham; Chong S. Hwang, Flushing; Harold Rhow, Hartsdale, all of N.Y.

[73] Assignees: Int'l Environmental Systems, Inc., Pittsfield, Mass.; Globe Environmental Protection, Inc., Flushing, N.Y.

[21] Appl. No.: 557,806

[22] Filed: Jul. 26, 1990

[51] Int. Cl.$^5$ .............................................. C02F 1/28
[52] U.S. Cl. ................................ 210/96.1; 210/196; 210/202; 210/207; 210/221.2; 210/223; 210/260; 210/266; 210/275
[58] Field of Search ................................ 210/703–705, 210/96.1, 195.1, 196, 197, 202, 203, 205, 220, 221.1, 221.2, 223, 260, 262, 275, 525, 530, 266, 207

[56] References Cited

U.S. PATENT DOCUMENTS

| | | | |
|---|---|---|---|
| 3,403,096 | 9/1968 | Mackrle et al. | 210/202 |
| 3,408,288 | 10/1968 | Messa | 210/202 |
| 3,429,442 | 2/1969 | Mackrle et al. | 210/202 |
| 4,151,093 | 4/1979 | Krofta | 210/386 |
| 4,377,485 | 3/1983 | Krofta | 210/704 |
| 4,626,345 | 12/1986 | Krofta | 210/104 |
| 4,626,346 | 12/1986 | Hall | 210/110 |
| 4,673,494 | 7/1987 | Krofta | 210/202 |
| 4,673,498 | 6/1987 | Swinney et al. | 210/275 |
| 4,673,500 | 6/1987 | Hoofnagle et al. | 210/307 |
| 4,931,175 | 6/1990 | Krofta | 210/86 |

OTHER PUBLICATIONS

The U.S. Dept. of Commerce, National Technical Information Service (NTIS) Report #PB 89-158,398 (1988).
L. K. Wang, U.S. Department of Commerce, National Technical Information Service, Springfield, Virginia, USA, Technical Report No. PB89-158398/AS, Oct. 1988.
L. K. Wang and W. J. Mahoney, Proceedings of the 44th Industrial Waste Conference, pp. 655-666, May 1989.
L. K. Wang and M. H. S. Wang and W. J. Mahoney, Proceedings of the 44th Industrial Waste Conference, pp. 667-673, May 1989.
L. K. Wang and M. H. S. Wang, AIchE Symposium of Design of Adsorption Systems for Pollution Control, 18P., Aug. 1989.

Primary Examiner—Peter Hruskoci
Attorney, Agent, or Firm—Birch, Stewart, Kolasch & Birch

[57] ABSTRACT

A water filtration multi-stage process and apparatus thereof for removing dissolved, colloidal, volatile, suspended and living contaminants from water or wastewater which includes chemical feeding, in-line static mixing, filtration chemical monitoring and optimization, aeration, hydraulic flocculation, grit settling, adsorption, filtration, disinfection, and final water conditioning by converting dissolved solids to insoluble forms by oxidation and chemical precipitation, and then by filtering the insoluble contaminants, adsorbing residual dissolved contaminants, disinfecting the living microorganisms, and applying magnetic or electronic field for conditioning to produce a purified water.

4 Claims, 3 Drawing Sheets

WATER FILTRATION APPARATUS

BACKGROUND OF THE INVENTION

1. Field of the Invention

The present invention relates to a water filtration process and an apparatus thereof and more particularly, to a multistage process and a package apparatus thereof for removal of dissolved, colloidal, suspended, volatile, and living contaminants from water.

2. Description of the Prior Art

Various types of filtration processes are well known in the art. In such filtration processes, the suspended contaminants in water are commonly removed by a physical separation procedure wherein the mixture of water and suspended contaminants are forced by gravity force or pumping force through a porous filtration barrier.

Such filtration barrier also known as a filter medium may be fabric of heavy weave, a micro scale wire screen, a thin plastic membrane of high porosity (several million pores per square inch) or a layer of sand. Such filter media retain suspended contaminants including bacteria and are used in various industrial and municipal applications. Clay suspensions are filtered by forced flow electrophoresis. Many fibrous or particulate materials often called "filter aids" can effect filtration; examples are special papers (Whatman), glass fibers, diatomaceous earth, fly ash, etc.

The construction and operations of many kinds of filtration equipments are too detailed to permit description. The most widely used filter types may be classified as follows (a) gravity filters used largely for water purification and consisting of thick beds of sand and gravel, which retain the flocculated impurities as the water passes through; (b) pressure filters of plate-and-frame or shell-and-leaf construction, which utilize filter cloths of coarse fabric as a separating medium; (c) vacuum or suction filters of the rotating drum or disk type used on thick sludges and slurries; (d) edge filters; and (e) diatomaceous earth filters. Gel filtration is a chromatographic technique involving separation at the molecular level Of the above five types of filters, only gravity rapid sand filtration, gravity slow sand filtration, and diatomaceous earth filtration are widely used in large scale municipal water and wastewater treatments. Accordingly, the three filtration processes are described in greater detail including advantages and disadvantages.

The gravity rapid sand filtration process is the most commonly found filtration technique in the United States of America for treating surface water sources. It provides the greatest latitude for treating a wide range of raw water qualities and raw waters subject to rapid shifts in quality. It is correspondingly the most complex and requires the greatest amount of operating expertise and attention. The rapid sand filtration process polishes the water which is pretreated by coagulation and sedimentation basins In a rapid sand filter, the filter media is usually 24 to 30 inches in depth. The sand media can be composed of 1 to 3 grades of sand varying in size and density An effective grain size in the 0.35 to 0.55 mm range is required for the filter media. Rapid sand filtration, as the name implies, has a filtering rate considerably higher than slow sand filtration. Rapid sand rates typically operate at 2 to 3 gpm/sf (gallons per square foot) of filter surface or about 50 times higher than the 0.03 to 0.10 gpm/sf for slow sand filter Under some ideal raw water conditions, assuming optimized pretreatment, filtration rates of 6 to 8 gpm/sf can be reached. Rapid sand filtration can effectively treat turbidities above 100 NTU and color up to 75 color units. The process can treat raw water with coliform levels greater than 20,000 per milliliter, significantly greater than gravity slow sand filtration and datomaceous earth filtration. Disadvantages of rapid sand filtration include high capital and operating costs, extensive operator training, and expertise in water treatment, water chemistry and microbiology. It also demands constant operator attention as opposed to the slow sand process.

The slow sand filtration process was developed over 100 years ago and remains a viable treatment process today. A slow sand filter plant is a biological process rather than a physical chemical one. It relies on the development of a biological layer to remove suspended contaminants including microorganisms. Since it relies on living microorganisms to aid in the sand filtration process, slow sand filters do not adapt themselves well to rapid changes in raw water quality. Extremes in turbidities or organic loading can also adversely affect performance by rapidly clogging the filter beds. In a typical slow sand filter operation, raw water is passed through the filter media composed of at least 30 inches of a well graded filter sand upon which the biological mass called a "schmutzdecke" is developed. Approximately two to three weeks is required to develop the "schmutzdecke" and acceptable filtered water quality. The slow sand filtration rate is very low, varying from 0.03 to 0.10 gpm/sf when compared with the much high flows of 2.0 gpm/sf for rapid sand filters. For this reason, a large slow sand filter bed with approximately 1,000 square feet of filter surface area is needed to produce 1 mgd (million gallons per day). Up to 1 NTU is reasonable for the filtered water in this process. The slow sand process because of its low capital and operating costs and less sophisticated operations is ideally suited to small communities. The process, however, cannot handle raw water turbidities much above 10 NTU nor appreciable algae or color content. Maximum raw water coliform levels should be below 800/100 ml. Colloidal clays in the raw water are also unacceptable. In summary slow sand filtration is a relatively simple process that does not require a highly technical staff to operate. Disadvantages include a need for an extensive amount of land and limited application to superior raw water quality.

The diatomaceous earth (DE) filtration process is an acceptable method for fulfilling the drinking water treatment requirements. Although a slightly more complex process than gravity slow sand filtration, it is nevertheless considerably simpler than the gravity rapid sand filtration process The primary removal mechanism in a DE filter, also called a "precoat filter", is straining through interstices created by diatomaceous media grains. Diatomaceous earth is actually crushed, classified, and processed silica obtained by mining fossilized diatoms, skeletons of microscopic marine organisms. The created mean media pore size is approximately 5 to 20 microns in diameter. The DE filtration process consists of three basic steps: precoating, filtering with body feed, and cleaning. The precoat is the application of the filter cake, an initial thick layer of 3 to 5 mm of diatomaceous earth, on a support membrane or septum. The cake is applied by creating a DE slurry in an auxiliary tank and forcing the slurry through the filter septum until the desired precoat thickness is obtained. At this point, the filtering operation can begin by passing raw water through the precoat filter cake. However, since the initial cake clogs rather quickly with particular, a constant feed of additional of the DE is needed to maintain the filter cake permeability This is accomplished by introducing a "body feed" which is a small, supplemental amount of a DE media slurry mixed into the raw water. The additional slurry is slowly added to the filter cake and thereby, maintaining the permeability of the filtering surface. When the head loss though the filter cake has increased to an undesirable level, the raw water/body feed influent which is stopped and the filter cake on the septum is removed and discarded. The typical filter loading rate is 1.5 gpm/sf. Filter runs can last from several hours up to two days depending on raw water characteristics, especially the particulate content. The greater body feed content is needed for a higher level of raw water particulates to prevent clogging of the filter cake. Generally, the DE filtration is only applicable for raw water sources that have turbidities less than 5 NTU, little sediment and algae. High levels of these undesirable contaminants can lead to "blinding" of the media or very rapid increases in head loss across the filter media and results in very short filter runs.

Other then state-of-the-art filtration technologies includes the following:

(a) oil-water separation, flotation, filtration and adsorption system, in which separate process reactors are connected in series for wastewater treatment; (b) mixing, flocculation, flotation and filtration system, in which four unit processes are incorporated into one package plant for water or wastewater treatment; (c) direct filtration system in which separate flocculation and rapid sand filtration are connected in series for treatment in water with low turbidity, color, algae, and other organic matter; (d) inline filtration system in which polymer is fed to precoat a rapid sand filtration bed for more efficient filtration of potable water with low turbidity, color, algae, and other organic matter; (e) upward moving inclined filter screen systems in which the endless filter screen used for filtration separation of large suspended matter from water, (f) preliminary filter, secondary filter, and reverse osmosis system in which separate filtration units are connected in series for more efficient water purification; and (g) automatic backwashing filter comprising: (1) particulate filter media confined between first and second screens for efficient filtration; and (2) rotatable backwashing pipes to permit automatic backwashing of filter media.

Such conventional water and wastewater filtration processes and apparatuses thereof are described in the U.S. Pat. No. 4,151,093 to Krofta, U.S. Pat. No. 4,377,485 to Krofta, U.S. Pat. No. 4,626,345 to Krofta, U.S. Pat. No. 4,626,346 to Hall, U.S. Pat. No. 4,673,494 to Krofta, U.S. Pat. No. 4,673,498 to Swinney et al, U.S. Pat. No. 4,673,500 to Hoofnagle et al and L. K. Wang, using Air Flotation and Filtration in color and Giardia removal. U.S. Department of Commerce, National Technical Information Service, Springfield, Va., USA. Technical Report No. PB89-158398/AS. October 1988. L. K. Wang and W. J. Mahoney. Treatment of Storm Run-off by Oil-Water Separation, Flotation, Filtration and Adsorption, Part A: Wastewater Treatment. Proceedings of the 44th Industrial Waste Conference, P. 655–666, May, 1989. L. K. Wang, M. H. S. Wang and W. J. Mahoney. Treatment of Storm Run-off by Oil-Water Separation, Flotation, Filtration and Adsorption: Part B: Waste sludge Management. Proceedings of the 44th Industrial Waste Conference, P. 667–673, May, 1989. L. K. Wang, M. H. S. Wang, Reduction of Color, Odor, Humic Acid and Toxic Substances by Adsorption, Flotation and Filtration, AIChe E Symposium on Design of Adsorption Systems for Pollution Control, 18 P., August, 1989.

SUMMARY OF THE INVENTION

Accordingly, it is an object of the present invention to provide an improved filtration.

Another object of the present invention to provide a combined process system and apparatus having a number of unique design features for improving water filtration efficiency and for cost saving.

A further object of the present invention is to provide a combined flocculation, grit settling adsorption, and filtration multistage process system and apparatus for eliminating the need of many separate treatment units or devices in comparable conventional filtration processes introduced previously.

Still another object of the present invention is to provide a combined flocculation-adsorption filtration apparatus including (a) special chemical monitor which accepts signals from a streaming current detecting cell, an optical density cell, a pH probe and the combination thereof for chemical optimization; (b) an in-line electronic or magnetic water conditioner for control of biological fouling, scale and corrosion; (c) a circular traveling filter backwash mechanism cleaning the adsorption and filtration beds; (d) means for operating the present invention under the automatic operation mode or manual operation mode; and (e) means for recycling and reuse of adsorbents and filter media.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a combined flocculation-adsorption filtration multi-stage process and apparatus which includes aeration, chemical flocculation, grit settling, adsorption, filtration, chemical monitoring, built-in automatic backwash mechanism, a separator for recycling the adsorbents and filter media to the adsorption filtration beds for reuse and a decanting tank for water-sludge separation for removing dissolved, colloidal, volatile, suspended, and living contaminants from water or wastewater wherein a majority of original and newly formed insoluble suspended sludges in the flocculated water or wastewater are collected by the effect of filtration and residual dissolved contaminants are removed by adsorption.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
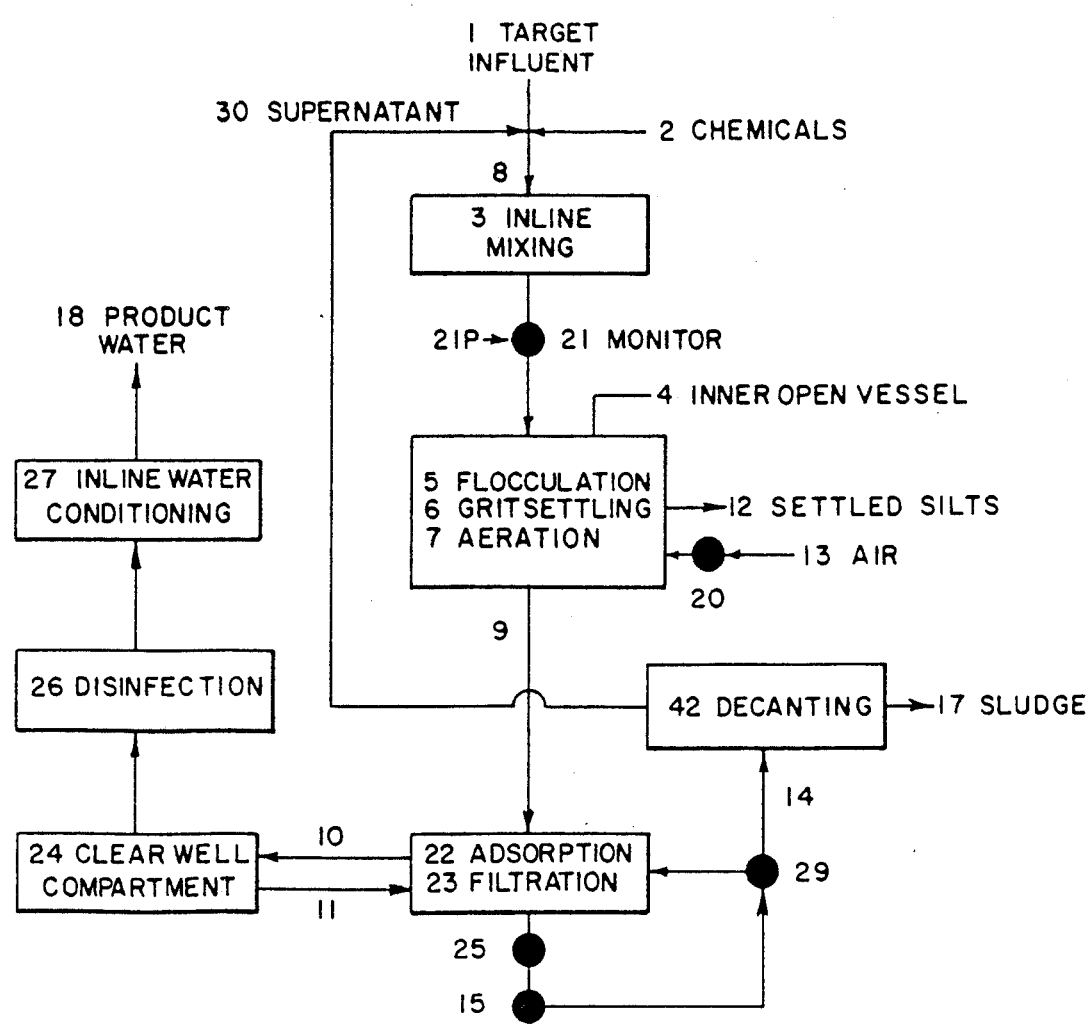
FIG. 1 shows the overall process according to the present invention.
Figure 2:
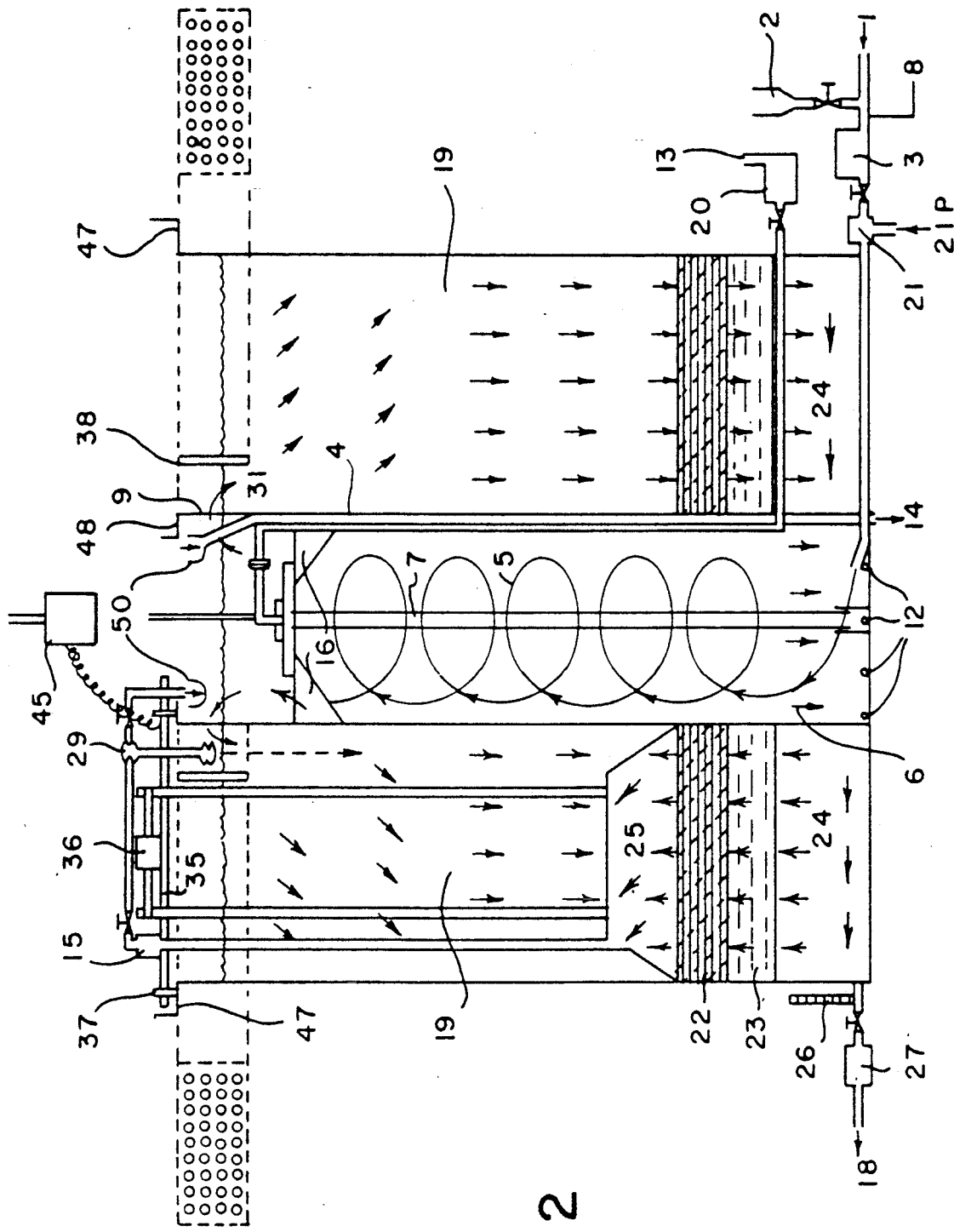
FIG. 2 is a sectional view of the apparatus according to the present invention.
Figure 3:
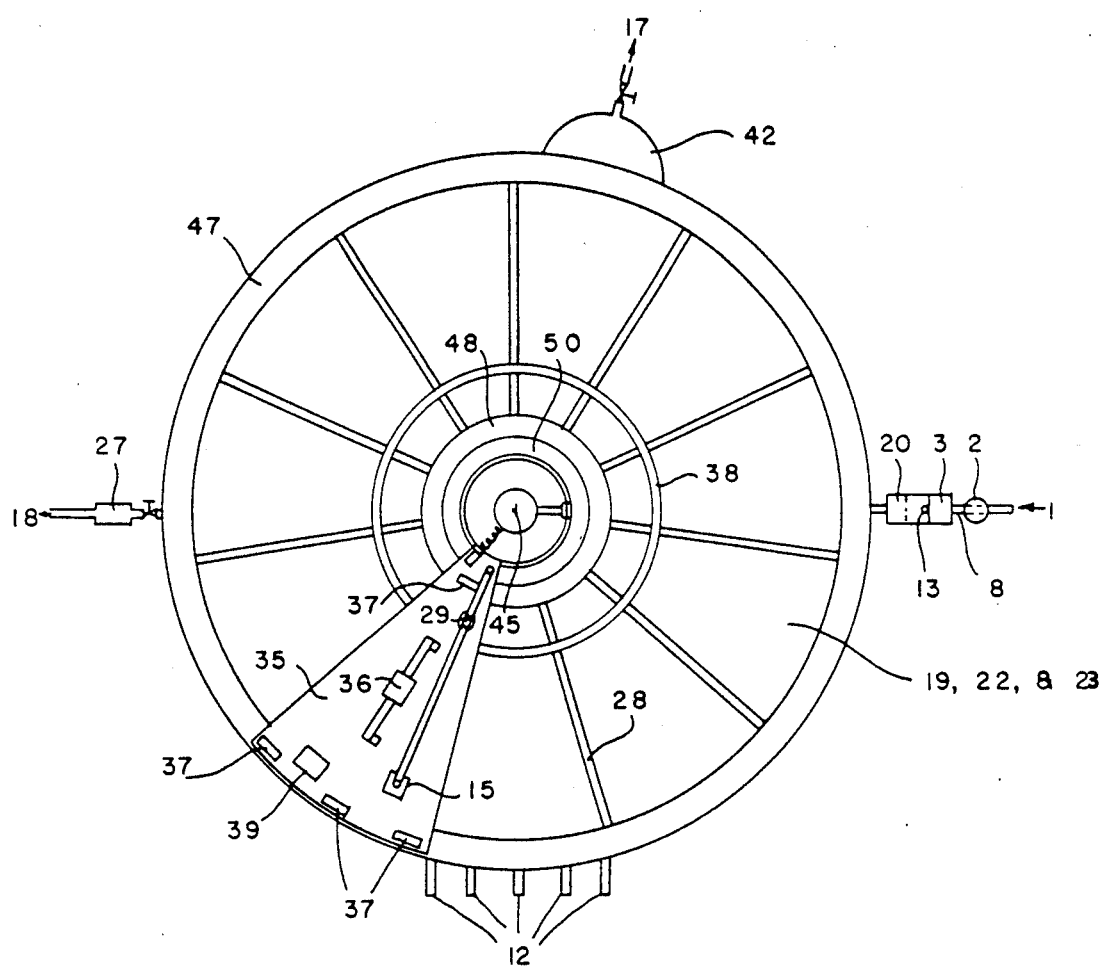
FIG. 3 is a top plan view of the apparatus according to the present invention.

Referring now in detail to the drawings for the purpose of illustrating preferred embodiments of the present invention, the water filtration process and the apparatus thereof are shown in the process steps of FIGS. 1, 2, and 3, which includes the steps of chemical feeding, in-line static mixing, monitoring, flocculating, grit settling, and aeration in a cylindrical inner open vessel, adsorption, sand filtration, automatic backwashing and clear well in a cylindrical outer tank disinfection, in-line water conditioning, automatic backwashing, decanting, and filter media separation. As shown in FIG. 1, a target influent 1 is primarily water or wastewater stream. First chemicals 2 can be added to the target influent 1 when necessary. The influent-chemical mixture is pumped through an inlet pipe 8 to the in-line static mixing 3 and a chemical monitor 21, and then to the cylindrical inner open vessel 4 at a tangential direction where flocculation 5 and grit settling 6 occur simultaneously. The in-line static mixing 3 can be replaced by a conventional mechanical mixing method or a fluidizing mixing method.

Air 13 is compressed by an air compressor 20 and added in varied amounts to a porous air diffuser 7 then to the inner open vessel 4 which are both inside of the main apparatus. The air 13 can also be replaced by oxygen. Either air or oxygen in the open vessel 4 is for removal of iron and manganese. The settled grits 12 disposed at the bottom of the inner open vessel 4 are periodically discharged to a scum and sludge collector (not shown). A measuring member can be provided on the apparatus for measuring the flow rates of the water and various gases in the inlet pipe 8, the inner open vessel 4, and other inlets and outlets. An effluent of the inner open vessel 4 passes through an unique influent distribution ring 38. An inner open vessel on effluent 9 flows downward to a gravity adsorption bed 22 and a filtration bed 23, then to a clear well compartment 24. Final treatments include disinfection 26 and in-line water conditioning 27 before the product water 18 is produced.

An unique monitor 21 monitors and controls pH, suspended solids and streaming current of the coagulated water stream entering the inner open vessel 4 and influent distribution ring 38. The monitor 21 is especially useful when treating water requires polyelectrolyte or inorganic flocculants for coagulation, or maintaining optimal pH ranges for the clarification of the water. The monitor 21 also feeds pH buffer chemicals 21P as a fixed but adjustable percentage of the primary coagulant dosage or in direct response to measured pH. The monitor 21 is capable of reacting quickly to rapid and wide optical density swings and accepts the signals from the built-in streaming current detecting cell, an optical density cell and/or a pH probe for chemical control An additional in-line water conditioner 27 can be installed before the inner open vessel 4.

The unique in-line electronic or magnetic water conditioner 27 does not have moving parts and inhibits biological fouling and corrosion. The in-line water conditioner 27 also descales the water treatment system and equipment.

As shown in FIGS. 2 and 3, the influent distribution ring 38 disposed between an open vessel effluent discharge zone 31 and an adsorption/filtration influent zone 19 may be about 1 to 2 feet below the water surface. A moving carriage 35 has a platform on which are mounted a driving motor 39 for an entire moving carriage 35, the backwashing mechanism 36 for a backwash hood 25, a backwash pump 15, and a filter media separator 29. The rotation direction of the moving carriage 35 can be either counterclockwise or clockwise. The rotation speeds of the moving carriage 35 is adjustable. There are rollers 37 carrying the weight of the entire moving carriage 35 and rolling on an outer rail 47 and an inner rail 48.

The beds 22 and 23 of the adsorption and filtration are divided into many "pie" shaped sections by dividers 28 and each combined adsorption and filtration section can be individually backwashed as shown in FIG. 3. The horizontal section of the backwash hood 25 is identical to a combined adsorption and filtration section as far as the shape and dimensions are concerned. The backwash hood 25 can move up and down with a motor and gearing member 36 and travel horizontally with the driving motor 39. When a combined adsorption and filtration section is ready to be backwashed, the backwash hood 25 travels to the top of that particular section, stops, moves down to seal the adsorption and filtration section, and starts to backwash by suction action with a backwash pump 15 for a specified time period. After the adsorption and the filtration beds 22 and 23 are thoroughly backwashed and cleaned, the backwash pump 15 stops, the backwash hood 25 moves up and travels to another adsorption and filtration section.

At the top and center of apparatus according to the present invention, there is an universal joint 45 for delivering power source to the entire apparatus. Immediately below the universal joint 45, there is the open vessel 4 for hydraulic flocculation 5, grit settling 6, and aeration 7. The center of the open vessel 4 is a plastic porous aeration tube 7 for uniform distribution of compressed air into water through out the entire open vessel 4. The open vessel 4 is supported by stainless steel angles 16, bolted at the center of the entire apparatus.

According to the present invention, in the process of the present invention, suspended solids are filtered by both adsorption bed 22 and filtration bed 23, while dissolved pollutants are removed by the adsorption bed 22. Colloidal substances are coagulated and destabilized in open vessel 4 before being filtered. Pathogenic bacteria and other microorganisms are stabilized in the open vessel 4, filtered by filtration bed, and further disinfected in a disinfection chamber 26. The water in a clear well compartment 24 is periodically pumped back through a pipe 11 for backwashing the adsorption bed 22 and filtration bed 23. The remaining water from the clear well 24 passes through the disinfection tank 26 and the effluent water conditioner 27 before discharging as the treated effluent 18. The backwash wastewater is sucked by the backwash pumping means 15 through the backwash hood 25, going to a separator 29 The sludge in the filter media-free water is settled in a decanting tank 42 by gravity, and is discharged as the settled sludge 17. The supernatant 30 is recycled for elimination of a secondary pollution and for water conservation. Small amount of the settled slit from the open vessel bottom 12 and the settled sludge 17 are transported to a separated process unit for final disposal.

The unique features of the present invention, which have been described are: (a) an in-line static mixing means is for chemical mixing and energy saving: (b) the monitor automatically adjusts and optimizes the chemical dosages; (c) the open vessel is a built-in aerator, flocculator, and grit settling chamber for space-saving, energy saving, and high oxidation performance; (d) circular automatic backwash adsorption beds and circular automatic backwash filtration beds remove suspended, dissolved, colloidal, and living substances; (e) backwashing and decanting means have provisions for washwater recycle and filter media recycle; and (f) in-line water conditioner polishes the treated effluent Accordingly, the present invention can treat either water or wastewater and produces no secondary pollution, except small volume of sludge.

Still another unique feature of the present invention is its simplicity and flexibility in process operation. Referring to FIGS. 1, 2, and 3, the process and the apparatus thereof can be operated under the automatic operation model or manual operation mode.

For the invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for treating water comprising in combination:

an inlet pipe with an in-line static mixing member, means for feeding chemical to said inlet pipe carrying said water, a built-in filtration chemical monitor monitoring pH, streaming current, turbidity, and optical density and adjusting the feeding of said chemical;

means for connecting said filtration monitor to said inlet pipe, means for feeding pH buffer chemical to said inlet pipe in response to said monitor, a cylindrical outer tank having the bottom thereof as an outside wall of said apparatus, a cylindrical inner open vessel disposed within said outer tank for aeration, flocculation and grit settling, means for introducing water tangentially into the bottom of said cylindrical inner open vessel, means for directing clarified effluent from the top of said open vessel into the cylindrical outer tank, means for removing settled, heavy silts, and sludges from the bottom of said inner open vessel, a cylindrical inner porous tube disposed within said inner open vessel for aeration and air distribution, means for introducing air to be uniformly distributed into said water in said inner open vessel through said porous tube to produce aerated flocculated water.

means for measuring the flow rates of said water and various gases in said inlet pipe, open vessel, and porous tube, releasing means for introducing said aerated flocculated water from said inner open vessel into said cylindrical outer tank for adsorption and filtration, an adsorption and filtration bed near the bottom of said cylindrical outer tank for downward purification of aerated/flocculated water, a clear well compartment over the bottom of said cylindrical outer tank for collection of adsorption and filtration purified liquid from said clear well for subsequent disinfection and water conditioning, a disinfecting means for treating the water from said clear well with dry-chlorine, a water conditioning means for treating the water from said disinfection means, backwashing means for periodically cleaning of said adsorption and filtration bed, wherein said backwashing means includes a traveling backwash hood means, pumping means, and separator a moving carriage having a platform supported between the upper portion of the wall of said outer tank and the upper portion of the wall of said inner tank so as to hold said pumping means, backwash hood means, separator, and driving motors, means for circular moving said moving carriage together with said pumping means, backwash hood means, separator, and driving motors along outer and inner rails on said apparatus and around the vertical axis of said apparatus, means for decanting the backwash wastewater from said backwashing means for removal of settled sludge, means for recycling supernatant water from said decanting means to the inlet pipe, and means for recycling a portion of water from said clear well into said adsorption and filtration beds for backwashing.

2. The apparatus of claim 1, wherein the adsorption and filtration bed are filled with the filter media selected form the group consisting of silica sands, granular activated carbons, activated alumina, ion exchange resins, manganese oxide greensands, polymeric resins, gravels, coals, metal filter medium, and combinations thereof.

3. The apparatus of claim 1, wherein the water conditioning means is capable of generating an electrical or magnetic field for control of biological fouling, scaling, and corrosion.

4. The apparatus of claim 1, wherein the dry chlorine is dry chlorine tablets.

* * * * *